S. W. HALL.
GRADOMETER.
APPLICATION FILED MAY 13, 1920.

1,378,540.

Patented May 17, 1921.

Inventor
S. W. Hall,
By
Attorney

UNITED STATES PATENT OFFICE.

SIDNEY WILSON HALL, OF SAN ANTONIO, TEXAS.

GRADOMETER.

1,378,540.  Specification of Letters Patent.  Patented May 17, 1921.

Application filed May 13, 1920. Serial No. 381,125.

*To all whom it may concern:*

Be it known that I, SIDNEY WILSON HALL, a citizen of the United States, and a resident of San Antonio, in the county of Bexar and State of Texas, have invented certain new and useful Improvements in Gradometers, of which the following is a specification.

My invention relates to gradometers, and the purpose of my invention is the provision of a gradometer which will accurately indicate under the most varying and unstable conditions the inclination and declination at which any moving body is traveling.

It is also a purpose of my invention to provide a gradometer which is particularly adapted for use on motor vehicles, its simplicity and compactness of construction permitting it being placed within the casing of a speedometer without modifying the latter's construction.

I will describe one form of gradometer embodying my invention and will then point out the novel features thereof in claims.

In the accompanying drawings.

Similar reference characters refer to similar parts in each of the several views.

Referring specifically to the drawings, F designates generally a frame of any suitable construction in which is journaled a shaft S, and fixed to the shaft adjacent one end thereof is a gear G. The gear G carries at diametrically opposite points a pair of weights W and W' which are preferably formed of lead and are arranged at one side of the gear in such manner as not to be at a balance, but sufficiently far enough below the line of balance or center of gravity to cause the weights to return to a horizontal position when the gear is moved.

Figure 2:
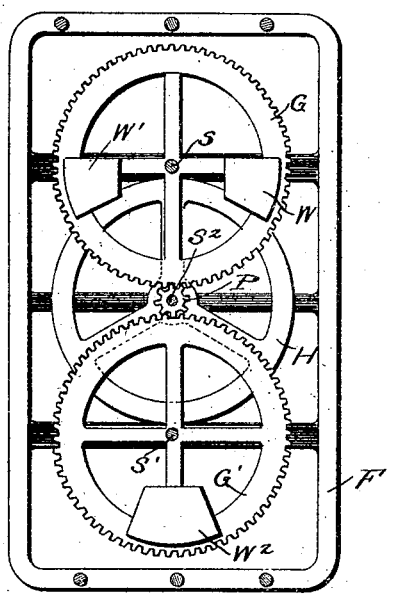
Fig. 2 is a view showing in side elevation the gradometer shown in Fig. 1.

Fixed to a shaft S' journaled in the frame F at a point below the shaft S is a second gear G' which is of the same diameter as the gear G and is provided upon one side thereof with a weight $W^2$. This weight $W^2$ is preferably formed of lead and is approximately of a weight equal to the combined weight of the weights W and W'. As shown in Fig. 2, the weight $W^2$ is disposed below the center of gravity of the gear G' so that it biases the gear to the position shown, which is its normal position, and thereby causes the same to return to its normal position after being moved.

Figure 1:
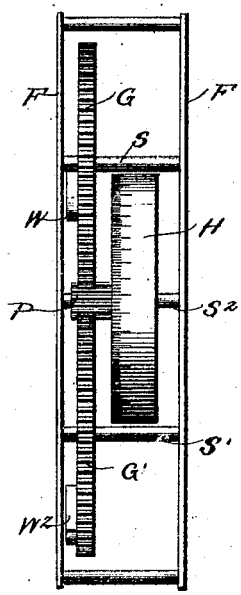
Figure 1 is a view showing in front elevation one form of the gradometer embodying my invention.
Figure 3:
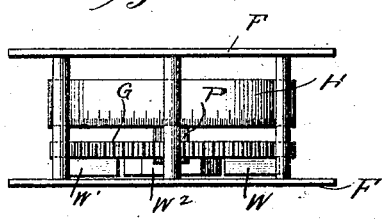
Fig. 3 is a top plan view showing the gradometer of the preceding views.

Interposed between the gears G and G' and journaled in the frame F is a shaft $S^2$ to which is fixed a pinion P that meshes with each of the gears G and G', as clearly shown in Fig. 2. As shown in Fig. 1, the shaft $S^2$ also carries at one side of the pinion P an indicating wheel H provided upon its periphery with graduations of some suitable standard of measure. The wheel H is preferably formed integrally with the pinion P so that they rotate with the shaft.

In operation, the weights W, W' and $W^2$ serve to maintain the gears G and G' in the position shown in Fig. 2 but when the vehicle upon which the instrument is carried is traversing an incline or a decline, the wheel H is caused to be rotated by virtue of the fact that the gears are substantially stationary while the pinion P is free to rotate under the action of the gears. It will be understood that the degree to which the wheel H is rotated is directly dependent upon the inclination or declination of the instrument with relation to the horizontal so that the graduations upon the wheel will indicate the degree of inclination or declination at which the vehicle is traveling.

From a consideration of Fig. 2, it will be manifest that the weights because of their disposition upon the gears co-act with each other to prevent a revolving back and forth of the indicating wheel when the latter is moved to an indicating position, while at the same time they insure the return of the wheel to its normal position.

Although I have herein shown and described only one form of gradometer embodying my invention, it is to be understood that various changes and modifications may be made herein without departing from the spirit of the invention or the spirit and scope of the appended claims.

Having described my invention, what I claim is:

1. A gradometer comprising, a pair of gears, weights associated with said gears to bias the same to pre-determined positions relatively, an indicating wheel, and means interposed between said wheel and gears for causing the wheel to indicate when the gears are rotated circumferentially and the amount of such rotation.

2. A gradometer comprising, a gear, weights carried at diametrically opposite points upon said gear and disposed below the center of support of the same, a second gear spaced from the first gear, a weight carried by the second gear and disposed below the center of support of such gear, a pinion interposed between the gears and meshing with the same, and an indicating wheel movable by said pinion, for the purpose described.

SIDNEY WILSON HALL.